(12) United States Patent
Natsuno et al.

(10) Patent No.: US 8,279,503 B2
(45) Date of Patent: Oct. 2, 2012

(54) SHEET MEDIA READING CONTROL METHOD AND SHEET MEDIA READING DEVICE

(75) Inventors: Atsushi Natsuno, Matsumoto (JP); Tomoaki Kimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 598 days.

(21) Appl. No.: 12/503,636

(22) Filed: Jul. 15, 2009

(65) Prior Publication Data

US 2010/0014130 A1  Jan. 21, 2010

(30) Foreign Application Priority Data

Jul. 17, 2008 (JP) ................................. 2008-185674

(51) Int. Cl.
- *H04N 1/04* (2006.01)
- *G06K 15/00* (2006.01)
- *G06K 9/18* (2006.01)
- *G06K 9/40* (2006.01)
- *G06K 9/00* (2006.01)

(52) U.S. Cl. ...... 358/498; 358/496; 358/1.12; 358/1.14; 382/182; 382/275; 382/137

(58) Field of Classification Search .................. 358/498, 358/496, 474, 1.14, 462, 1.12; 235/475; 271/251, 265.01; 382/135, 137, 182

See application file for complete search history.

(56) References Cited

U.S. PATENT DOCUMENTS

| | | | |
|---|---|---|---|
| 2004/0136586 A1* | 7/2004 | Okamura | 382/137 |
| 2005/0271296 A1* | 12/2005 | Tsuji et al. | 382/275 |
| 2008/0099560 A1 | 5/2008 | Fujikawa et al. | |
| 2011/0033111 A1* | 2/2011 | Fujikawa et al. | 382/182 |

FOREIGN PATENT DOCUMENTS

| | | |
|---|---|---|
| JP | 63311656 | 12/1988 |
| JP | 09212707 | 8/1997 |
| JP | 2004206362 | 7/2004 |
| JP | 2005165822 | 6/2005 |
| JP | 2005225661 | 8/2005 |
| JP | 2008102661 | 5/2008 |
| JP | 2008117040 | 5/2008 |

* cited by examiner

*Primary Examiner* — Charlotte M Baker
*Assistant Examiner* — Rury Grisham (57) ABSTRACT

A sheet media reading control method includes conveying a sheet medium on which magnetic ink characters are printed through a transportation path, reading the magnetic ink characters and an image of the sheet medium using a magnetic head and an image sensor head positioned along the transportation path, extracting partial scanned image data containing at least an outside edge part of the sheet medium from the scanned image data captured by the image sensor head, executing a skew evaluation based on the partial scanned image data to detect if the sheet medium is conveyed skewed at a skew angle exceeding an allowable skew angle, and invalidating at least the magnetic ink character data captured by the magnetic head from sheet media that are determined by the skew evaluation to be skewed.

9 Claims, 6 Drawing Sheets

SHEET MEDIA READING CONTROL METHOD AND SHEET MEDIA READING DEVICE

CROSS-REFERENCE TO RELATED APPLICATIONS

Japanese Patent application No. 2008-185674, filed Jul. 17, 2008, is hereby incorporated by reference in its entirety.

BACKGROUND

1. Field of Invention

The present invention relates to a sheet media reading control method and a sheet media reading device that avoid character recognition errors caused by characters being recognized when the sheet medium is skewed while the check or other sheet medium is conveyed through a media transportation path.

2. Description of Related Art

In banks and other financial institutions, checks, promissory notes, and other check-like negotiable instruments (collectively referred to as "checks" herein) submitted for payment or processing are loaded into a check reading device to capture images of the front and back and read the magnetic ink character line, and then sort the checks based on the read results. As electronic processing of such checks has become more common, the captured image data and magnetic ink character data is typically processed by computer and the check information is managed by computer.

A typical check processing device reads the magnetic ink character line and captures images of the front and back of each check using a magnetic head and image sensors (image scanning heads) as the checks are conveyed one by one horizontally standing on edge through a transportation path defined by a narrow vertical channel. The downstream end of the transportation path is connected to a first discharge pocket (first discharge unit) and a second discharge pocket (second discharge unit). Checks from which the magnetic ink characters are read normally are discharged into the first discharge pocket, and all other checks are discharged into the second discharge pocket. Checks that are discharged into the second discharge pocket are conveyed and processed again. A check processing device of this type is taught in Japanese Unexamined Patent Appl. Pub. JP-A-2004-206362.

A check processing device that has a detection unit to detect multifeed states in which two or more checks are simultaneously conveyed overlapping is disclosed in Japanese Unexamined Patent Appl. Pub. JP-A-2005-225661, and a check processing device having a detection unit to detect when a check is conveyed with the top and bottom inverted or the front and back reversed is taught in Japanese Unexamined Patent Appl. Pub. JP-A-2008-117040.

If the conveyed sheet medium is transported in a skewed position or if the bottom of the sheet is off the bottom of the transportation path in a sheet media processing device such as a check processing device, errors may occur when recognizing characters based on the magnetic ink character information read by the magnetic head. The information read by the magnetic head of the check processing device is processed by the check processing device or is sent to a host computer and processed to recognize the magnetic ink characters contained therein by applying a magnetic ink character recognition process. If the check passes the reading position of the magnetic head while being conveyed in a skewed position (including conditions in which at least a part of the check is above the bottom of the transportation path) through the transportation path, the scanned magnetic ink characters will be skewed and may be incorrectly recognized as different characters by the character recognition process.

SUMMARY OF INVENTION

A sheet media reading control method according to the present invention detects if the sheet medium is conveyed in a skewed position (including elevated positions) that could cause magnetic ink character recognition errors and enables recognizing the magnetic ink characters accurately.

A sheet medium reading device according to the present invention uses the magnetic ink character reading control method to read magnetic ink characters.

A first aspect of the invention is a sheet media reading control method including: conveying a sheet medium on which magnetic ink characters are printed through a transportation path; reading the magnetic ink characters and an image of the sheet medium using a magnetic head and an image sensor head positioned along the transportation path; extracting partial scanned image data containing at least an outside edge part of the sheet medium from the scanned image data captured by the image sensor head; executing a skew evaluation based on the partial scanned image data to detect if the sheet medium is conveyed skewed at a skew angle exceeding an allowable skew angle; and invalidating at least the magnetic ink character data captured by the magnetic head from sheet media that are determined by the skew evaluation to be skewed.

The invention executes a skew evaluation determining if the sheet medium is conveyed skewed at a skew angle exceeding an allowable skew angle to the normal transportation position. Therefore, by setting this allowable skew angle appropriately, character recognition will not be applied to magnetic ink characters using magnetic ink character information read from a sheet medium that is skewed so much that magnetic ink character recognition errors will occur. As a result, magnetic ink character recognition errors caused by skewed media can be avoided.

Furthermore, because evaluating sheet media skew is done using partial scanned image data containing at least a part of the outside edge of the sheet medium extracted from the scanned image of the sheet medium, less data is needed for skew evaluation, and the processing time can be shortened. The skew evaluation can therefore be done using the control circuit of limited processing power typically used in a check processing device or other sheet media processing device, eliminating the need to send the scanned image data to a host computer system for evaluation.

In the sheet media reading control method according to another aspect of the invention, rectangular sheet media are conveyed standing through the transportation path, and a portion of the scanned image data that contains at least an image of the bottom edge of the sheet medium when the sheet medium is conveyed normally is used as the partial scanned image data.

Sheet media processing devices such as check processing devices generally convey checks and other sheet media horizontally through a transportation path that is defined by a narrow vertical channel. Because the bottom edge of the sheet medium is horizontal when conveyed normally through this transportation path, a portion of the image containing image data for this bottom edge can be extracted, and whether the sheet medium is skewed can be determined based on the slope of this bottom edge.

Furthermore, because checks and other such rectangular sheet media are generally conveyed with the long side in line with the transportation direction, enough image data to determine if the medium is skewed can be acquired if the scanned image of this bottom edge portion is used. In contrast, if image data including the leading edge or the trailing edge, that is, a short side of the sheet medium, is used, less data is available compared with the long side, and the accuracy of skew evaluation will drop. In addition, the likelihood of the leading end or trailing end of the check or other sheet medium being folded or bent is greater than the likelihood of the top or bottom edges of the long sides being folded or bent, and the accuracy of skew evaluation can be reduced by such folds. By determining if the sheet medium is skewed based on scanned image data containing the long bottom edge of the sheet medium, however, the invention can improve the accuracy of skew evaluation.

The sheet media reading control method of the invention preferably also has a step of determining if the sheet medium is skewed based on pixel position information and pixel brightness information in the bottom edge image of the sheet medium.

Brightness information enables detecting the border between the sheet medium with a high brightness value and the low brightness background behind the sheet medium, that is, enables detecting the bottom edge of the sheet medium. Furthermore, because the position of this bottom edge can be known from the pixel position information, whether the sheet medium is skewed to the transportation direction can be determined.

The sheet media reading control method according to another aspect of the invention also includes: extracting n pixels from pixel 1 to pixel n (where n is a positive integer) from the bottom edge along the media transportation direction that are contained in the scanned image of each one scan line captured by the image sensor head perpendicularly to the transportation direction of the sheet medium, and using these extracted pixels as the partial scanned image data; and in the skew evaluation comparing the brightness of each of the n pixels in each single scan line with a predetermined threshold value, determining the k-th scanned pixel that is at the bottom of a group of pixels containing a predetermined number of consecutive scanned pixels each exceeding the threshold value in a particular scan line to be the bottom edge of the sheet medium, calculating a total K of the numbers k denoting a bottom edge for each group of scan lines containing a predetermined m number of scan lines along the transportation direction, where K=k(1)+k(2)+ . . . +k(m−1)+k(m), calculating a change $\Delta K(i)$ between the totals K(i) that are adjacent in the transportation direction for each total K(i) (where i is a positive integer) obtained for each group of m scan lines in the transportation direction, where $\Delta K(i)=K(i)-K(i-1)$, comparing change $\Delta K(i)$ to a minimum change $\Delta K\min$ that corresponds to the allowable skew angle, and determining that the sheet medium is skewed if the number of change $\Delta K(i)$ values greater than minimum change $\Delta K\min$ is greater than the number of change $\Delta K(i)$ values that are less than or equal to minimum change $\Delta K\min$.

The evaluation method according to another aspect of the invention detects the position of the bottom edge of the sheet medium in groups of plural (m) scan lines, and determines if the skew angle of the sheet medium exceeds an allowable skew angle based on the change in the bottom edge position calculated for each group of plural scan lines. By calculating the change between groups of plural scan lines, a drop in the accuracy of bottom edge detection caused by foreign matter on the bottom edge part of the sheet medium, the brightness of the print image printed on the front bottom edge, small interruptions of the bottom edge portion, tears, and other factors can be prevented.

The invention also calculates the change $\Delta K(i)$ between a plurality of adjacent scan lines, determines the skew angle for parts of the bottom edge of the sheet medium corresponding to the plural scan lines, and determines the sheet medium is skewed when there are more places where the skew angle exceeds the allowable skew angle than not. If a part of the bottom edge of the sheet medium is missing, the edge at that part will appear to be skewed at a large angle to the transportation direction. By using a majority rule based on the results of evaluating the magnitude of the change $\Delta K(i)$ to determine if the sheet medium is skewed, wrongly determining that the sheet medium is skewed due to such a locally inclined bottom edge portion even though the sheet medium is being conveyed in the normal position can be prevented.

The sheet media reading control method according to another aspect of the invention considers change $\Delta K(i)$ values that are greater than or equal to a predetermined maximum change $\Delta K\max$ invalid and does not use them for skew evaluation.

If there is a large tear or a portion of the bottom edge part of the sheet medium is missing, the value of change $\Delta K(i)$ increases abnormally. To remove such parts from use in the skew evaluation, this aspect of the invention does not use any change $\Delta K(i)$ values that are greater than or equal to the maximum change $\Delta K\max$ for skew evaluation. Whether or not the sheet medium is skewed can thus be accurately determined.

In the sheet media reading control method according to another aspect of the invention, a first discharge unit and a second discharge unit into which sheet media are discharged after passing the transportation path are provided, and the reading control method discharges at least sheet media that are determined to be skewed by the skew evaluation into the second discharge unit, and discharges other sheet media into the first discharge unit.

If sheet media determined to be skewed are discharged into the same discharge unit as the sheet media that are read correctly, the skewed sheet media must be retrieved from the discharge unit in order to read and process them again. The invention makes rescanning the sheet media easier by discharging the skewed sheet media into a different discharge unit.

Another aspect of the invention is a sheet media reading device including a transportation path that conveys sheet media on which magnetic ink characters are printed; an image sensor head that reads an image of the sheet medium conveyed through the transportation path; a magnetic head that reads magnetic ink characters from the sheet medium conveyed through the transportation path; a skew evaluation unit that determines if the sheet medium is conveyed skewed at a skew angle exceeding an allowable skew angle to the normal transportation condition based on partial scanned image data containing at least an outside edge part of the sheet medium extracted from the scanned image data captured by the image sensor head; and an image data processing unit that invalidates at least the magnetic ink character data captured by the magnetic head from sheet media that are determined by the skew evaluation unit to be skewed.

Preferably, the sheet media reading device also has a first discharge unit and a second discharge unit into which sheet media are discharged after passing the transportation path; a sorting mechanism that sorts sheet media delivered from the transportation path to one of the first and second discharge units; and a sorting control unit that switches the sorting mechanism held directing the sheet media into the first discharge unit so that the sheet medium is discharged into the second discharge unit when the skew evaluation unit determines that the sheet medium is conveyed in a skewed position.

Yet further preferably, the skew evaluation unit of the sheet media reading device extracts n pixels from pixel 1 to pixel n (where n is a positive integer) from the bottom edge along the media transportation direction that are contained in the scanned image of each one scan line captured by the image sensor head perpendicularly to the transportation direction of the sheet medium, and uses these extracted pixels as the partial scanned image data, compares the brightness of each of the n pixels in each single scan line with a predetermined threshold value, determines the k-th scanned pixel that is at the bottom of a group of pixels containing a predetermined number of consecutive scanned pixels each exceeding the threshold value in a particular scan line to be the bottom edge of the sheet medium, calculates a total K of the numbers k denoting a bottom edge for each group of scan lines containing a predetermined m number of scan lines along the transportation direction, where $K=k(1)+k(2)+\ldots+k(m-1)+k(m)$, calculates a change $\Delta K(i)$ between the totals $K(i)$ that are adjacent in the transportation direction for each total $K(i)$ (where i is a positive integer) obtained for each group of m scan lines in the transportation direction, where $\Delta K(i)=K(i)-K(i-1)$, compares change $\Delta K(i)$ to a minimum change $\Delta Kmin$ that corresponds to the allowable skew angle, and determines that the sheet medium is skewed if the number of change $\Delta K(i)$ values greater than minimum change $\Delta Kmin$ is greater than the number of change $\Delta K(i)$ values that are less than or equal to minimum change $\Delta Kmin$.

Yet further preferably, the skew evaluation unit considers change $\Delta K(i)$ values that are greater than or equal to a predetermined maximum change $\Delta Kmax$ invalid and does not use them for skew evaluation.

Another aspect of the invention is a sheet media reading device that reads characters using a character reading head from rectangular sheet media on which text and images are printed while conveying the sheet media through a transportation path formed in the reading device, the sheet media reading device including: a scanner that is positioned near the transportation path and scans the images and characters printed on the sheet media; an evaluation unit that extracts partial scanned image data in an area containing the characters printed lengthwise along the rectangular sheet medium from the scanned image data read by the scanner, obtains a position of a bottom edge of the sheet medium from the partial scanned image data, and determines if the sheet medium is skewed; a scan data processing unit that invalidates recognition of characters read by the character reading head when the sheet medium is determined to be skewed; and a discharge pocket including a first discharge unit that stocks the sheet media determined by the evaluation unit to be skewed, and a second discharge unit that stocks the sheet media determined by the evaluation unit to not be skewed.

Furthermore, because evaluating sheet media skew is done using partial scanned image data containing a part of the outside edge of the sheet medium extracted from the scanned image of the sheet medium, less data is needed for skew evaluation, and the processing time can be shortened. The skew evaluation can therefore be done using the control circuit of limited processing power typically used in a check processing device or other sheet media processing device, and it is not always necessary to send the scanned image data to a host computer system for evaluation.

The invention executes a skew evaluation determining if the sheet medium is conveyed skewed at a skew angle exceeding an allowable skew angle. Therefore, by setting this allowable skew angle appropriately, character recognition will not be applied to magnetic ink characters using magnetic ink character information read from a sheet medium that is skewed so much that magnetic ink character recognition errors will occur. As a result, magnetic ink character recognition errors caused by skewed media can be avoided.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A preferred embodiment of a sheet media processing device according to the present invention is described below with reference to the accompanying figures.

*General Configuration

Figure 1:
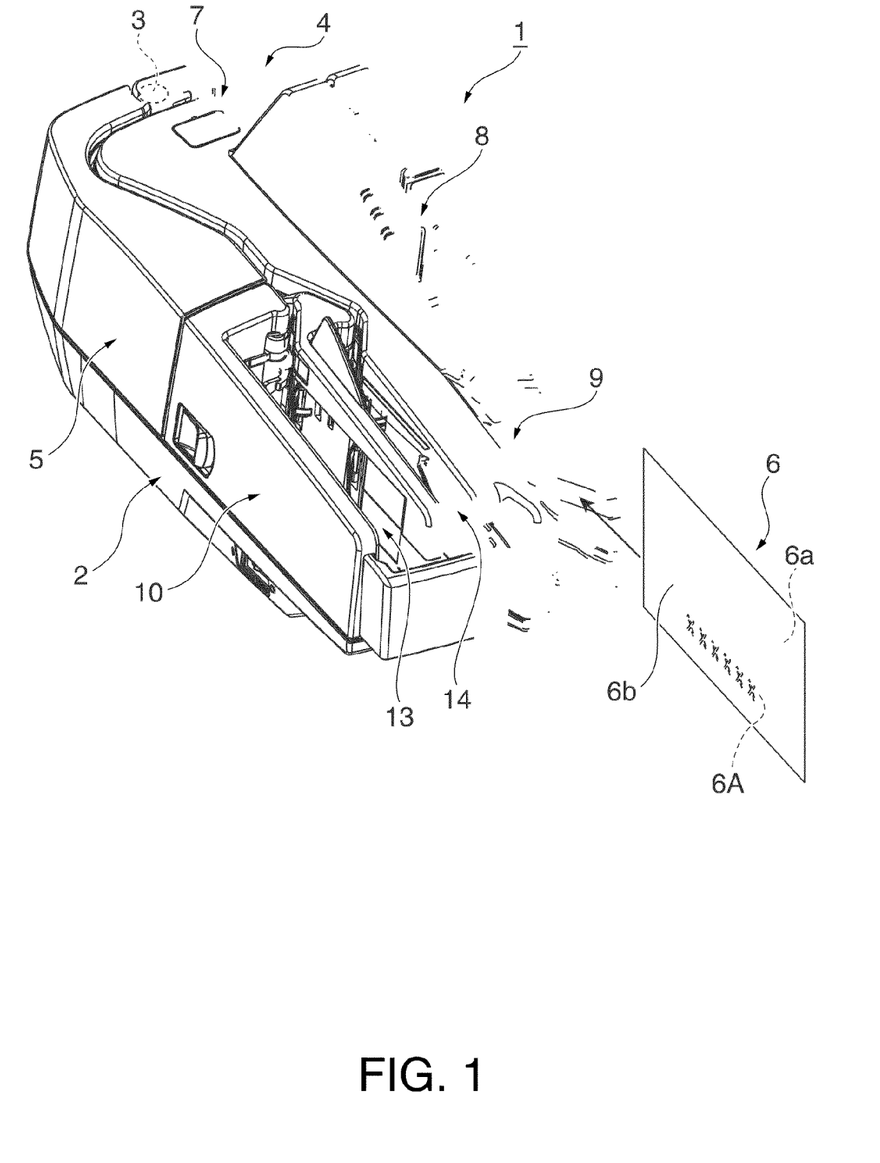
FIG. 1 is an oblique view of a check processing device according to the present invention.
Figure 2:
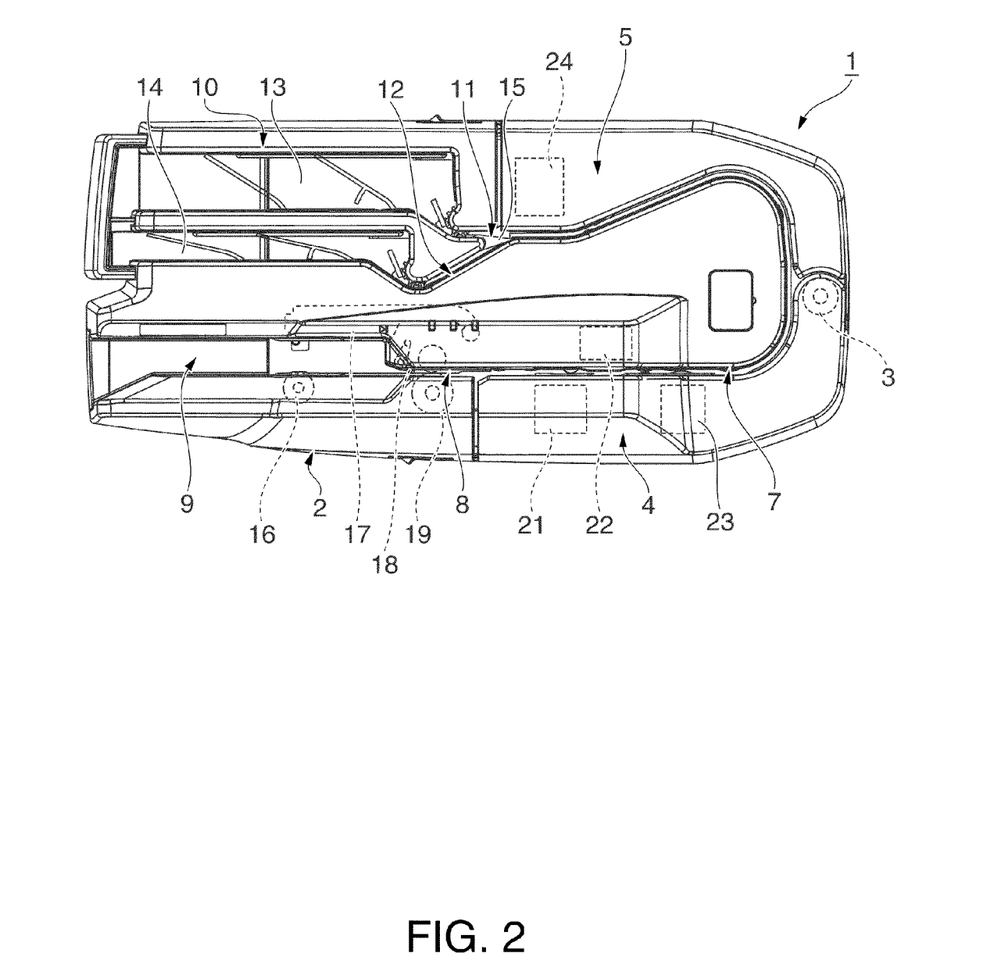
FIG. 2 is a plan view of the check processing device shown in FIG. 1.

FIG. 1 and FIG. 2 are an oblique view and a plan view of a check processing device according to a preferred embodiment of the invention.

The check processing device 1 has a case 2 on the main unit side and a pair of left and right access covers 4 and 5 that open and close pivoting on a vertical support pin 3 disposed at the end part of the case 2. A check transportation path 7 for conveying checks 6 is formed between the case 2 and the access covers 4 and 5.

The check transportation path 7 has a basically U-shaped configuration when seen from above, and is a narrow vertical channel. The upstream end of the check transportation path 7 in the transportation direction is connected through an upstream transportation path portion 8 that is a narrow vertical channel to a check storage unit 9, which is a wide vertical channel. The downstream end of the check transportation path 7 is connected to a check discharge unit 10.

The check discharge unit 10 has first and second branch paths 11 and 12 that are narrow vertical channels connected to the downstream end of the check transportation path 7, a first discharge pocket 13 and a second discharge pocket 14 that are connected to the downstream ends of the branch paths, and a flapper 15 that directs discharging the check 6 to one of the discharge pockets 13 and 14.

As shown in FIG. 1, an MICR line 6A is printed along the long bottom edge on the front 6a of the check 6. Also recorded on the front 6a against a patterned background are the check amount, payer and payee, various numbers, and the payer signature. An endorsement is recorded on the back 6b of the check 6. The checks 6 are loaded in the check storage unit 9 with the tops and bottoms of the checks together and the fronts 6a facing the outside of the substantially U-shaped check transportation path 7.

The checks 6 are loaded in a stack into the check storage unit 9, and a check feeding mechanism that feeds the checks 6 one at a time through the check feed path 8 into the check transportation path 7 is assembled to the check storage unit 9. As indicated by the dotted lines in FIG. 2, the check feeding mechanism includes a pickup roller 16 that picks and delivers the checks 6 loaded in the check storage unit 9 into the check feed path 8, and a pressure member 17 that presses the checks 6 against the pickup roller 16. A separation mechanism including a separation pad 18 and a retard-roller type separation unit 19 is also provided for separating and feeding the checks 6 delivered to the check feed path 8 one at a time into the check transportation path 7.

As indicated by the dotted lines in FIG. 2, a front contact image sensor 21 for imaging the fronts 6a of the checks 6, a back contact image sensor 22 for imaging the backs 6b of the checks 6, a magnetic head 23 for reading the MICR line 6A, and a printing mechanism 24 for printing ELECTRONIC FUNDS TRANSFER, for example, on the check front 6a are disposed in this order along the check transportation path 7.

A transportation mechanism (not shown in the figure) conveys checks 6 along the check transportation path 7. The transportation mechanism can be rendered using a transportation motor, a plurality of transportation rollers disposed along the check transportation path 7, and a drive belt for transferring torque from the motor to the transportation rollers.

As a check 6 that is fed from the check storage unit 9 through the check feed path 8 is conveyed along the check transportation path 7, images of the front and back of the check are captured, and the MICR line 6A printed on the front 6a is then read. If this information is captured normally from the check 6, ELECTRONIC FUNDS TRANSFER or other text is printed and the check 6 is directed to and stored in the first discharge pocket 13 (first discharge unit). If the check 6 cannot be read or a read error occurs, the check 6 is directed to and stored in the second discharge pocket 14 (second discharge unit) without being printed.

*Control System

Figure 3:
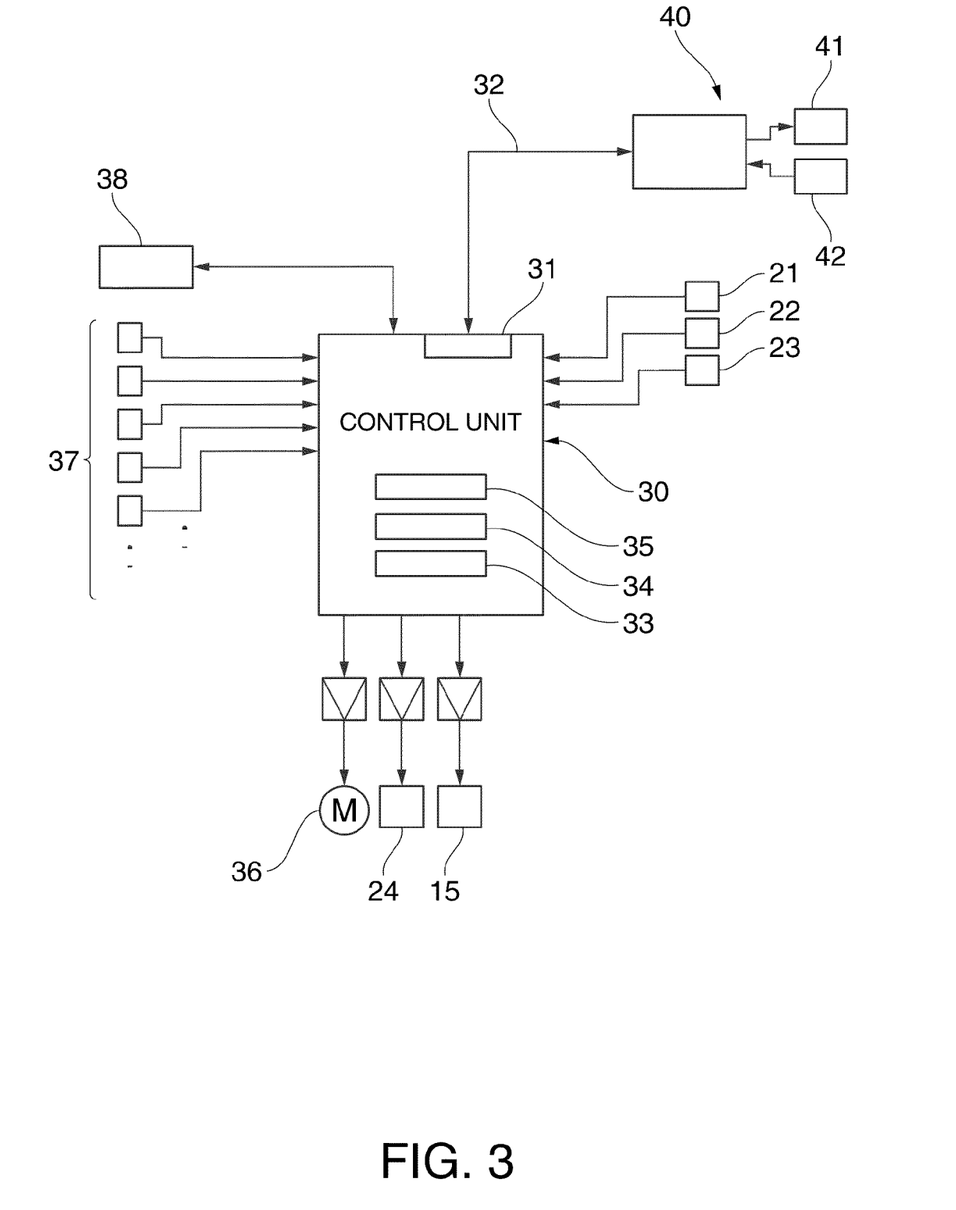
FIG. 3 is a function block diagram showing the control system of the check processing device in FIG. 1.

FIG. 3 is a block diagram describing the control system of the check processing device 1. The control system of the check processing device 1 includes memory such as ROM and RAM, and a control unit 30 built around a CPU. The control unit 30 is connected to a host computer system 40 through a communication unit 31 and communication cable 32.

The host computer system 40 has input/output devices such as a display device 41 and operating units 42 such as a keyboard and mouse, and commands such as a check reading operation start command are output from the host computer system 40 to the control unit 30 of the check processing device 1.

The control unit 30 has a skew evaluation unit 33 that determines from the front image scanning information and back image scanning information if a check 6 is being conveyed at a skew angle exceeding the allowable skew angle relative to the normal transportation position in which the check 6 is not skewed.

The control unit 30 also has a sorting control unit 34 that switches the flapper 15 from the position where it is held directing checks 6 into the first discharge pocket 13 to discharge the check 6 into the second discharge pocket 14 if the skew evaluation unit 33 determines that the check 6 is being conveyed in a skewed position.

The control unit 30 also has a read information processing unit 35 that invalidates the captured magnetic ink character information, the front image, and the back image read from a check 6 determined by the skew evaluation unit 33 to be in a skewed position. The read information processing unit 35 sends an invalidation command to invalidate the captured information through the communication unit 31 to the host computer system 40. When this invalidation command is received, the host computer system 40 does not execute the magnetic ink character recognition process, for example, because the data is invalid.

When the read operation start command is received, the control unit 30 drives the transportation motor 36 to convey a check, feeds a check 6 into the check transportation path 7, and conveys the fed check 6 through the check transportation path 7. The control unit 30 controls conveying the check 6 based on signals from a sensor group 37 of sensors disposed at plural positions along the check transportation path 7. A front image, back image, and the magnetic ink character data captured from the check 6 by the front contact image sensor 21, the back contact image sensor 22, and the magnetic head 23 are input to the control unit 30.

The captured information is sent to the host computer system 40, the host computer system 40 executes image processing and character recognition operations, determines if the information was read correctly, and returns the result of this decision to the control unit 30. Based on the received result, the control unit 30 controls driving the printing mechanism 24 and the flapper 15. Note that an operating unit 38 including operating switches such as a power switch disposed to the case 2 is connected to the control unit 30. Note, further, that the control unit 30 may be configured to execute the magnetic ink character recognition process, image processing and character recognition operations, and determine if the information was read correctly.

*Check Processing Operation

Figure 4:
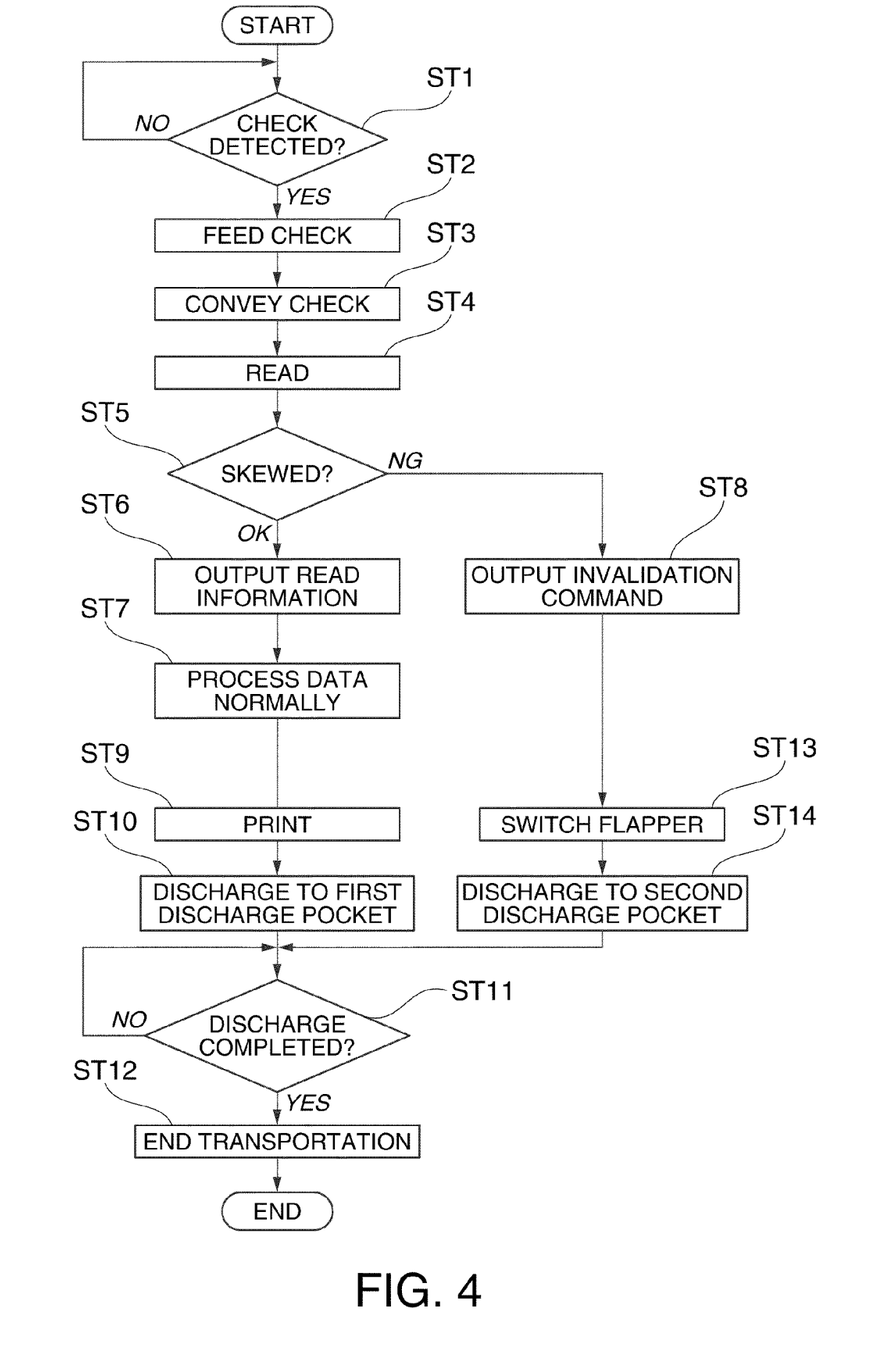
FIG. 4 is a flow chart of the check processing operation of the check processing device shown in FIG. 1.

FIG. 4 is a flow chart describing the processing operation of the check processing device 1. When the user enters a start reading command from the operating unit 42 of the host computer system 40, whether a check 6 is inserted to the check storage unit 9 is first detected. If a check is inserted, the check 6 is fed from the check storage unit 9 and the fed check 6 is conveyed through the check transportation path 7 (steps ST1, ST2, ST3). An image of the front, an image of the back, and the MICR line are read from the conveyed check 6 by the front contact image sensor 21, back contact image sensor 22, and magnetic head 23, respectively (step ST4).

The skew evaluation unit 33 determines if the check 6 is skewed based on information about a part of the captured information (step ST5). If it is determined that the check 6 is not skewed, the captured information is sent through the communication unit 31 and communication cable 32 to the host computer system 40 (step ST6). If it is determined that the check 6 is conveyed in a skewed position, the read information processing unit 35 generates and sends an invalidation command for invalidating the read information to the host computer system 40 (step ST8).

If the check 6 is conveyed with the top and bottom reversed (upside down), a read error is returned because the magnetic ink characters cannot be read. This is because the MICR line 6A on the check 6 does not pass the position where the magnetic head 23 is located. A read error is also returned if the check 6 is conveyed with the front and back reversed (backwards) because the magnetic ink character information cannot be acquired. A read error is also returned if a part of the magnetic ink character line cannot be read because the check 6 is folded, torn, or conveyed in a skewed position, for example. A read error is also returned if the check amount and other specific information cannot be recognized from the front and back check images as a result of the check 6 being folded, torn, or conveyed in a skewed position, for example.

If the control unit 30 of the check processing device 1 is configured to process the captured front image data, back image data, and magnetic ink character information and determine if the check was read normally, high speed processing is possible. Whether the check was read normally or not may also be decided on the host computer system 40 side instead of by the control unit 30. In this configuration the result of the host computer system 40 determining if the check was read normally is sent to the check processing device 1 and received by the control unit 30 thereof.

Only if the skew evaluation unit 33 decides that the check is not conveyed in a skewed position and it is determined that the check was read normally (step ST5 returns OK), the control unit 30 of the check processing device 1 determines that reading was normal (step ST7), and prints ELECTRONIC FUNDS TRANSFER, for example, on the check 6 using the printing mechanism 24 (step ST9), and the printed check 6 is then discharged by the flapper 15 to the first discharge pocket 13 side (step ST10). When the check 6 is completely stored in the first discharge pocket 13, the transportation operation stops (steps ST11 and ST12).

The flapper 15 is also switched (step ST13) if read errors are detected or it is determined that reading is not possible (steps ST5, ST8). The printing mechanism 24 is also held in the standby position and does not print on the check 6. The check 6 is directed to the second discharge pocket 14 by the flapper 15 and discharged therein (step ST14). When the check 6 is completely stored in the second discharge pocket 14, the transportation operation stops (steps ST11, ST12).

The printing mechanism 24 also does not print and the flapper 15 is switched (step ST13) when skewed feeding is detected by the skew evaluation unit 33. The check 6 is thus directed into the second discharge pocket 14 by the flapper 15 and discharged therein (step ST14). When the check 6 is completely stored in the second discharge pocket 14, the transportation operation stops (steps ST11, ST12).

*Skew Evaluation Process

Figure 5:
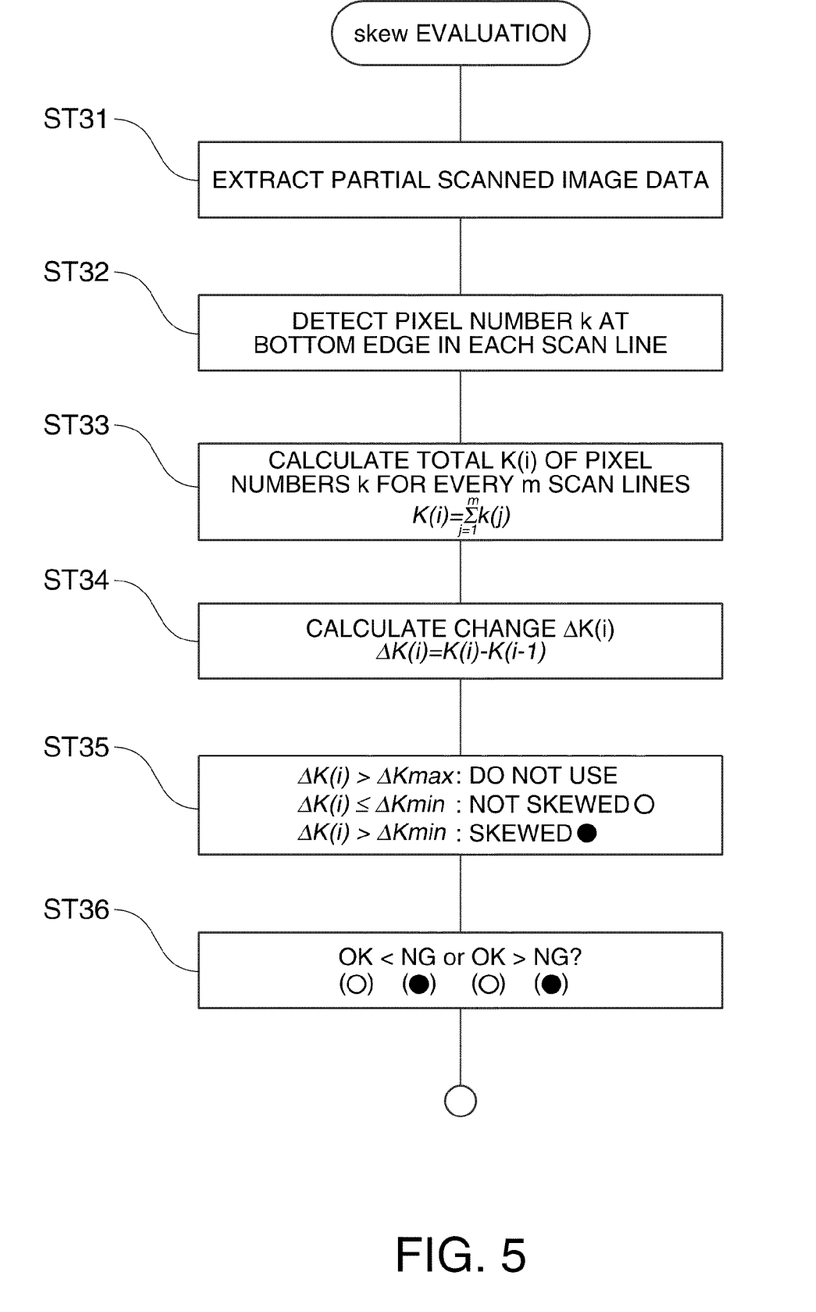
FIG. 5 is a flow chart of the skew evaluation process of the check processing device shown in FIG. 1.

FIG. 5 is a flow chart showing an example of the skew evaluation process executed by the skew evaluation unit 33, and FIG. 6 describes the operation of this process.

This embodiment of the invention extracts an area of a specific height perpendicular to the transportation direction of the check 6 from the bottom edge of the scanned image data including the image of the front of the check 6 captured by the front contact image sensor 21, and uses these extracted pixels as the partial scanned image data for determining skewed conveyance of the check (step ST31 in FIG. 5). More particularly, this embodiment extracts the n pixels from pixel 1 to pixel n (where n is a positive integer) from the bottom edge along the media transportation direction that are contained in one scan line of the front contact image sensor 21.

For example, if the number of pixels in one scan line is 808 pixels and the pixel pitch and the scan line pitch p are 0.125 mm (that is, 8 pixels/mm), pixels 1 to 100 from the bottom edge are used.

Figure 6A:
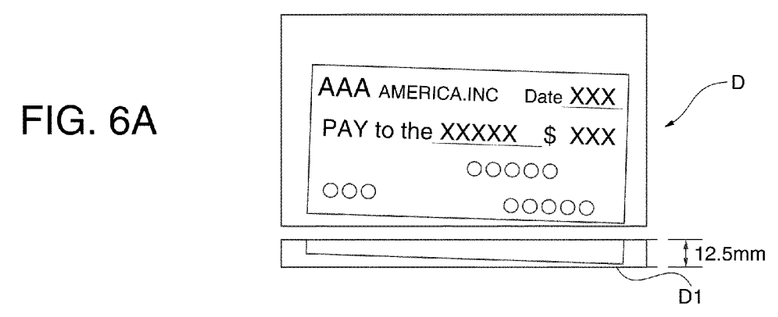
FIGS. 6A-G show the operation of the skew evaluation process shown in FIG. 1

In this configuration, the narrow 12.5 mm wide band from the bottom edge of the front scanned image data D, which is rectangular and long in the transportation direction, is used as the partial scanned image data D1 that is used for skew evaluation.

The skew evaluation unit 33 compares the brightness of each of the n pixels in each single scan line with a predetermined threshold value, and determines the pixel number k located at the bottom edge of the check 6 on the one scan line (step ST32 in FIG. 5). For example, if the brightness of pixels 1 to 49 is less than or equal to the threshold value, and pixel number 50 exceeds the threshold value, the position of the bottom edge of the check 6 in this one scan line is determined to be pixel 50.

If there is dust or other foreign matter on the surface of the check 6, a pixel on the surface of the check 6 may be less than or equal to the threshold value. In this situation there may be a plurality of positions where the pixel brightness changes from less than or equal to the threshold value to greater than the threshold value, and the position of the bottom edge of the check 6 may be incorrectly detected.

To avoid such detection errors, when a plurality of pixels exceeding the threshold value are consecutively detected, such as when eight consecutive pixels exceed the threshold value, that is, when the threshold value is exceeded for 1.25 mm or longer (=8 pixels×0.125 mm), this embodiment of the invention selects the lowest pixel number in that group of pixels, or more specifically the number of the pixel at the bottom of that pixel group, as the number representing the position of the bottom edge of the check 6 on that one scan line.

Figure 6B:
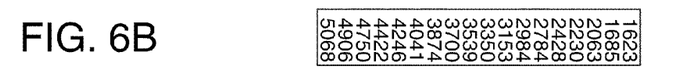
Figure 6C:
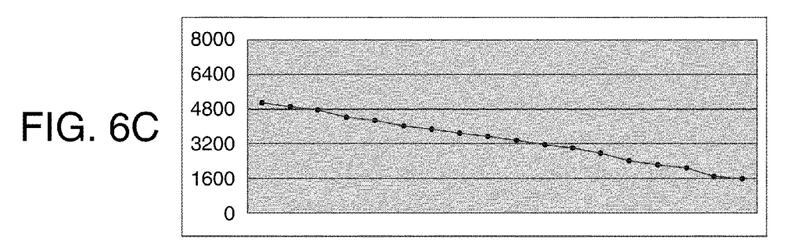

After the pixel number where the bottom edge of the check 6 is located is detected for each scan line, the total K(i) (where i is a positive integer) of the numbers k denoting the bottom edge is obtained for each of the predetermined m scan lines (where m is a positive integer) along the transportation direction (step S33 in FIG. 5). For example, the total K of the numbers k is obtained for 80 (=m) scan lines. In other words, the total K(i) is obtained for each 12.5 mm (=80 lines×0.125 mm) wide group in the transportation direction. FIG. 6B shows a list of the calculated totals K(i), and FIG. 6C is a graph of the results with the x-axis showing the distance from the back end of the check 6 in the transportation direction, and the y-axis showing the totals K(i) where K(i)=k(1)+k(2)+ . . . +k(m−1)+k(m).

Figure 6D:
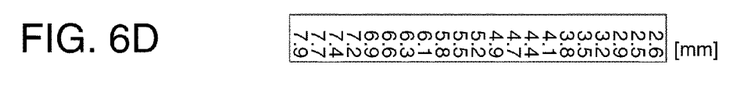

FIG. 6D shows the distance from the bottom edge of the scanned image to the bottom edge of the check 6 denoted by each total K(i). For example, the first distance of 7.9 mm is calculated as follows.

$$\{K(1)/m\}p = \{5068/80\} \times 0.125 \text{ mm} = 7.9 \text{ mm}$$

By thus totaling numbers k, the effect of deviations can be reduced when the bottom edge of the 6 moves up or down due to a tear or fold, for example, in any part within this 12.5 mm width.

The change ΔK(i) between the totals K(i) that are adjacent in the transportation direction is then obtained for each total K(i) obtained for each group of 80 (m) scan lines in the transportation direction (step S34 in FIG. 5). For example, if the first total K(i) is 5068 and the second total K(i) is 4906, the resulting change ΔK(i) is 162.

Figure 6E:
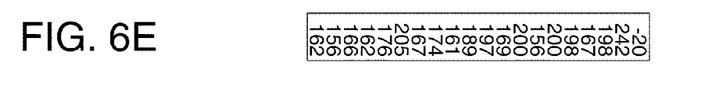
Figure 6F:
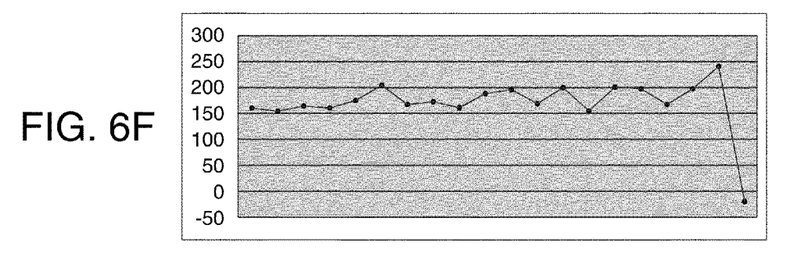

FIG. 6E shows an array of the calculated change ΔK(i) values, and FIG. 6F is a graph of these values. Note that change ΔK(i)=K(i)−K(i−1).

Each change ΔK(i) is then compared with the following two threshold values, that is, maximum change ΔKmax and minimum change ΔKmin (step ST35 in FIG. 5).

Whether change ΔK(i) is less than maximum change ΔKmax is decided first. If this change ΔK(i) is greater than the maximum change ΔKmax, it is not used to determine skewing. If there is a large tear, for example, in the bottom edge part of the sheet medium, the value of change ΔK(i) will be abnormally great. Because such parts cannot be used for skew evaluation, this embodiment of the invention invalidates such values so that skewing can be determined accurately. $\Delta K(i) < \Delta K\max$ Next, change values $\Delta K(i)$ determined to be valid are compared with minimum change $\Delta K\min$. The part of the check 6 where this change $\Delta K(i)$ was detected is determined to not be skewed if change $\Delta K(i)<$minimum change $\Delta K\min$, and is otherwise determined to be skewed. The value of minimum change $\Delta K\min$ is a value corresponding to the allowable skew angle of the check 6. If $\Delta K(i) \leqq \Delta K\min$, the sheet medium is not skewed; if $\Delta K(i) > \Delta K\min$, the sheet medium is skewed.

Figure 6G:
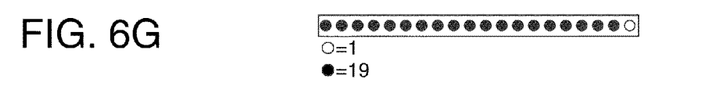

FIG. 6G shows the results of this evaluation with a white circle denoting no skewing and black dots denoting skewing. In this example there is 1 white circle and 19 black dots.

The number of OK results denoted here by a white circle and the number of NG results denoted by a black dot are then compared, and the majority value determines the result of the check 6 skewing evaluation (step ST36 in FIG. 5). In the example shown in FIG. 6G the check 6 is therefore determined to be skewed. If both results are equal in number, the sheet medium may, for example, be determined to be skewed.

*Other Embodiments of the Invention

The embodiment of the invention described above relates particularly to a check processing device. The invention is not limited to check processing devices, however, and can be applied to any sheet medium transportation device that conveys sheet media one sheet at a time.

The preferred embodiment described above also has the skew evaluation unit for determining skewed feeding of the check disposed on the check processing device side. Skew evaluation can, however, be done on the host computer side.

Furthermore, in addition to detecting skew evaluation, the embodiment of the invention described above may also detect check multifeeding, and conveyance of the medium with the top and bottom upside down or the front and back reversed, and may be configured to send a signal to the host computer side to invalidate the read information when such a medium transportation error is detected.

Yet further, methods other than the method used in the embodiment described above may be used as the skew evaluation method.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A sheet media reading control method comprising:
conveying a sheet medium on which magnetic ink characters are printed through a transportation path;
reading the magnetic ink characters and an image of the sheet medium using a magnetic head and an image sensor head located along the transportation path;
extracting partial scanned image data containing at least an outside edge part of the sheet medium from the scanned image data captured by the image sensor head;
executing a skew evaluation based on the partial scanned image data to detect if the sheet medium is conveyed skewed at a skew angle exceeding an allowable skew angle; and
invalidating at least the magnetic ink character data captured by the magnetic head from sheet media that are determined by the skew evaluation to be skewed at a skew angle exceeding the allowable skew angle; wherein
rectangular sheet media are conveyed standing through the transportation path; and
a portion of the scanned image data that contains at least an image of the bottom edge of the sheet medium when the sheet medium is conveyed normally is used as the partial scanned image data; and further comprising:
determining if the sheet medium is skewed based on pixel position information and pixel brightness information in the bottom edge image of the sheet medium.

2. The sheet media reading control method described in claim 1, further comprising:
extracting n pixels from pixel 1 to pixel n (where n is a positive integer) from the bottom edge along the media transportation direction that are contained in the scanned image of each one scan line captured by the image sensor head perpendicularly to the transportation direction of the sheet medium, and using these extracted pixels as the partial scanned image data; and
in the skew evaluation
comparing the brightness of each of the n pixels in each single scan line with a predetermined threshold value,
determines the k-th scanned pixel that is at the bottom of a group of pixels containing a predetermined number of consecutive scanned pixels each exceeding the threshold value in a particular scan line to be the bottom edge of the sheet medium,
calculating a total K of the numbers k denoting a bottom edge for each group of scan lines containing a predetermined m number of scan lines along the transportation direction, where $K=k(1)+k(2)+\ldots+k(m-1)+k(m)$,
calculating a change $\Delta K(i)$ between the totals $K(i)$ that are adjacent in the transportation direction for each total $K(i)$ (where i is a positive integer) obtained for each group of m scan lines in the transportation direction, where $\Delta K(i)=K(i)-K(i-1)$,
comparing the change $\Delta K(i)$ to a minimum change $\Delta K\min$ that corresponds to the allowable skew angle, and
determining that the sheet medium is skewed if a number of change $\Delta K(i)$ values greater than the minimum change $\Delta K\min$ is greater than a number of change $\Delta K(i)$ values that are less than or equal to the minimum change $\Delta K\min$.

3. The sheet media reading control method described in claim 2, wherein:
change $\Delta K(i)$ values that are greater than or equal to a predetermined maximum change $\Delta K\max$ are considered invalid and not used for skew evaluation.

4. The sheet media reading control method described in claim 1, wherein:
a first discharge unit and a second discharge unit into which sheet media are discharged after passing the transportation path are used; and
the reading control method discharges at least sheet media that are determined to be skewed by the skew evaluation into the second discharge unit, and
discharges other sheet media into the first discharge unit.

5. A sheet media reading device, comprising:
a transportation path that conveys sheet media on which magnetic ink characters are printed;
an image sensor head that reads an image of a sheet medium conveyed through the transportation path;
a magnetic head that reads magnetic ink characters from the sheet medium conveyed through the transportation path;
a skew evaluation unit that determines if the sheet medium is conveyed skewed at a skew angle exceeding an allowable skew angle based on partial scanned image data containing at least an outside edge part and a bottom edge of the sheet medium extracted from the scanned image data captured by the image sensor head; and an image data processing unit that invalidates at least the magnetic ink character data captured by the magnetic head from sheet media that are determined by the skew evaluation unit to be skewed at a skew angle exceeding the allowable skew angle; and wherein skew evaluation is based on pixel position and brightness information in the bottom edge image of the sheet medium.

6. The sheet media reading device described in claim 5, further comprising:

a first discharge unit and a second discharge unit into which sheet media are discharged after passing the transportation path;

a sorting mechanism that sorts sheet media delivered from the transportation path to one of the first and second discharge units; and a sorting control unit that switches the sorting mechanism held directing the sheet media into the first discharge unit so that the sheet medium is discharged into the second discharge unit when the skew evaluation unit determines that the sheet medium is conveyed in a skewed position.

7. The sheet media reading device described in claim 5, wherein:

the skew evaluation unit extracts n pixels from pixel 1 to pixel n (where n is a positive integer) from the bottom edge along the media transportation direction that are contained in the scanned image of each one scan line captured by the image sensor head perpendicularly to the transportation direction of the sheet medium, and uses these extracted pixels as the partial scanned image data, compares the brightness of each of the n pixels in each single scan line with a predetermined threshold value, determines the k-th scanned pixel at the bottom of a group of pixels to be the bottom edge of the sheet medium when the brightness of each pixel in the group containing a predetermined number of continuous scanned pixels exceeds the threshold value in a particular scan line, calculates a total K of the numbers k denoting a bottom edge for each group of scan lines containing a predetermined m number of scan lines along the transportation direction, where $K=k(1)+k(2)+\ldots+k(m-1)+k(m)$, calculates a change $\Delta K(i)$ between the totals $K(i)$ that are adjacent in the transportation direction for each total $K(i)$ (where i is a positive integer) obtained for each group of m scan lines in the transportation direction, where $\Delta K(i)=K(i)-K(i-1)$, compares the change $\Delta K(i)$ to a minimum change $\Delta Kmin$ that corresponds to the allowable skew angle, and determines that the sheet medium is skewed if a number of change $\Delta K(i)$ values greater than the minimum change $\Delta Kmin$ is greater than a number of change $\Delta K(i)$ values that are less than or equal to the minimum change $\Delta Kmin$.

8. The sheet media reading device described in claim 7, wherein:

the skew evaluation unit considers change $\Delta K(i)$ values that are greater than or equal to a predetermined maximum change $\Delta Kmax$ invalid and does not use them for skew evaluation.

9. A sheet media reading device that reads characters using a character reading head from rectangular sheet media on which text and images are printed while conveying the sheet media through a transportation path formed in the reading device, comprising:

a scanner that is positioned along the transportation path and scans the images and characters printed on the sheet media;

an evaluation unit that extracts partial scanned image data in an area containing the characters printed lengthwise along the rectangular sheet medium from the scanned image data read by the scanner, obtains a position of a bottom edge of the sheet medium from the partial scanned image data, and determines if the sheet medium is skewed;

a scan data processing unit that invalidates recognition of characters read by the character reading head when the sheet medium is determined to be skewed; and a discharge pocket including a first discharge unit that stocks the sheet media determined by the evaluation unit to be skewed, and a second discharge unit that stocks the sheet media not determined by the evaluation unit to be skewed; and wherein skew evaluation is based on pixel position and brightness information in the bottom edge image of the sheet medium.

* * * * *